United States Patent [19]

Naqwi et al.

[11] Patent Number: 5,513,004
[45] Date of Patent: *Apr. 30, 1996

[54] DEVICE FOR INTERFEROMETRIC MEASUREMENTS WITH COMPENSATION FOR TILT AND POSITION OF MEASURED CYLINDRICAL OBJECTS

[75] Inventors: Amir A. Naqwi, Shoreview; Leslie M. Jenson, Vadnais Heights, both of Minn.

[73] Assignee: TSI Incorporated, St. Paul, Minn.

[*] Notice: The term of this patent shall not extend beyond the expiration date of Pat. No. 5,453,837.

[21] Appl. No.: 289,910

[22] Filed: Aug. 12, 1994

[51] Int. Cl.$^6$ ............................................. G01B 9/02
[52] U.S. Cl. ........................... 356/357; 356/349; 356/336
[58] Field of Search ........................... 356/349, 345, 356/357, 336

[56] References Cited

U.S. PATENT DOCUMENTS

3,953,128  4/1976  Holly ........................ 356/357
4,986,659  1/1991  Bachalo ..................... 356/336

Primary Examiner—Frank Gonzalez
Assistant Examiner—Robert Kim
Attorney, Agent, or Firm—Frederick W. Niebuhr

[57] ABSTRACT

An interferometric system for measuring cross-sectional dimensions of glass fibers and other elongate objects includes: a transmitting optics module for generating two laser beams, and causing the laser beams to intersect and interfere with one another over a measuring volume; several photodetectors to collect the light scattered by the glass fiber positioned in the interference region; and signal processing circuitry to deduce the fiber diameter using phase shifts between the signal pairs and fiber velocity using the frequency of the signals. The system further offers: elimination of the 360° limitation on the product of sensitivity (degrees per micron) and range (microns), accompanied by an increase in accuracy using three or more detectors; uniform sensitivity over a large measuring volume, using fringe flare to compensate for changes in the effective angular separation of the detectors, due to fiber displacement within the measuring volume; and insensitivity to fiber tilt using large-area detectors for receiving the light scattered by the fiber.

18 Claims, 7 Drawing Sheets

——— WIDE BEAMS, POINT DETECTORS
--------- NARROW BEAMS, ELONGATE DETECTORS
ELEVATION ANGLES: +/-65°
14 um FIBER DIAMETER

DEVICE FOR INTERFEROMETRIC MEASUREMENTS WITH COMPENSATION FOR TILT AND POSITION OF MEASURED CYLINDRICAL OBJECTS

BACKGROUND OF THE INVENTION

The present invention relates to non-contact interferometric measurement of cylindrical objects to determine a variety of parameters and characteristics, e.g. cross-sectional dimensions, velocities, temperature and composition. The invention is directed to several enhancements of devices described in U.S. patent application Ser. No. 08/093,812 entitled "Interferometric Cylinder Sizing and Velocimetry Device" filed Jul. 19, 1993. That application, incorporated herein by reference, is assigned to the assignee of this application.

As in the prior application, the instrument described herein is meant to obtain measurements at high rates while maintaining high accuracy. The enhancements are particularly well suited to the sizing of optical fibers during their manufacture. Since optical fibers are drawn at speeds ranging from 10 to about 100 meters per second, it is necessary to take measurements at high frequency, e.g. up to several hundred thousand measurements per second. This facilitates finding localized defects, confined to a few millimeters of the fiber length. Also, the fiber diameter should be controlled to within about one percent of a selected fiber diameter, to ensure the desired optical and mechanical properties.

As disclosed in the aforementioned application, high speed and accuracy are achieved by detecting, at two different locations, laser energy scattered by the fiber. A variety of manufacturing processes and conditions present challenges in this regard. For example, the phase difference (phase shift) measurement depends upon the fiber refractive index as well as the fiber diameter. The most common cause for a change in refractive index is a change in temperature, although the refractive index also is influenced by a change in material composition. A change in refractive index, if undetected, can lead to an erroneous conclusion as to fiber diameter.

Another challenge, which also is encountered in the related field of laser Doppler velocimetry, is the need to strike a balance between measuring sensitivity (phase shift per incremental diameter change, e.g. degrees/micron) and measurement range. Because of the 360° upper limit to phase shift measurements, increasing sensitivity decreases the measurement range. Otherwise a measured phase may significantly differ from the actual phase shift. This is frequently referred to as "$2\pi$ ambiguity". A known approach to this problem is to obtain two phase shift measurements, one to accommodate high sensitivity and the other to accommodate a broad range. While this approach is satisfactory in many instances, it is limited by the fact that it offers only one phase difference measurement selected for sensitivity.

Another need arises in connection with enlarging the measuring volume at the intersection of the laser beams. A system with a larger measuring volume requires less alignment skill and thus is easier to use. However, it is subject to variance in detector elevation angles, based on changes in the location at which the fiber or other object intersects the measuring volume. The failure to detect, and compensate for, positional shifts of the fiber can lead to erroneous assumptions as to changes in fiber diameter, caused by phase shift signals that vary according to fiber displacement within the measuring volume.

Yet another challenge arises in connection with a different manufacturing application. More particularly, glass fibers formed in the manufacture of thermal insulation and fiberglass are manufactured using a spinning device that forces molten glass through small openings. The resulting fibers are transported by an airflow. In this process, the requirements of signal rate and fiber sizing accuracy are less demanding than in the fiber drawing process. However, fiber orientation changes significantly with time and signals must be collected intermittently, due to the inevitable flopping of individual fibers.

In view of these challenges, it is an object of the present invention to provide a fiber diameter measurement system incorporating correction for changes in the fiber refractive index and enhanced measurement accuracy through combining two separate measurements of object diameter.

Another object of the invention is to provide an interferometric sizing method that simultaneously affords high sensitivity and a broad measurement range.

A further object is to provide an interferometric cylinder sizing device with a larger measuring volume and compensation for displacements of the measured object within the measuring volume.

Yet another object is to provide an interferometric system for sizing cylindrical objects, with substantially reduced sensitivity to skew of the object relative to the beam plane.

SUMMARY OF THE INVENTION

To achieve these and other objects, there is provided an apparatus for the non-contact measuring of a cylindrical object. The apparatus includes a source of coherent energy and a beam forming means for generating two linearly propagating beams of the coherent energy. A beam guide means causes the two beams to intersect at a predetermined angle. The phenomenon of wave interference occurs in the intersection region, which serves as the measuring volume. A support means positions the beams with respect to a cylindrical object to cause the cylindrical object and the measuring region to intersect one another, with a longitudinal axis of the cylindrical object substantially perpendicular to the beam plane. When present in the measuring volume, the cylindrical object scatters the coherent energy. A signal generating means, including at least first and second energy detectors, generates at least three periodic signals. These include first and second periodic signals generated respectively by the first and second detectors based on respective portions of the coherent scattered energy received by the first and second energy detectors. A phase value generating means, operatively associated with the signal generating means, combines the periodic signals in pairs to generate at least two different phase shift values. Based on the phase shift values, a processing means determines a single transverse dimension of the cylindrical object.

The third periodic signal is generated either by a third scattered energy detector or by the beam guide means.

The cylindrical object may be present in the measuring volume continuously as in the case of drawn fiber, or intermittently as in the case of centrifugally generated and blown fibers.

The phase difference values are used to determine cylinder index of refraction as well as cylinder diameter. Most commonly a change in index of refraction indicates a change in temperature, although a change in material composition also can change the refractive index. Since individual phase shifts are proportional to cylinder diameter, their ratios are independent of the diameter and depend upon the cylinder refraction index only. For small changes in refractive indices, it is also feasible to combine two phase shift measurements linearly to obtain a phase shift value that is independent of cylinder refractive index.

The multiple phase shift values are employed to overcome the limitations on sensitivity and range imposed by the 360° periodicity of the phase. If a single phase shift value is employed, the product of sensitivity (degrees of phase change per unit of cylinder diameter, e.g. degrees/micron) and measurable range of cylinder diameters, is 360°. Thus, an increase in sensitivity requires a decrease in range, and vice versa. According to the present invention, two or more phase shift values are employed to overcome this limitation. Further, the detectors can be selectively positioned such that the sensitivity of the two phase shifts is comparable. As a result, overall accuracy is enhanced by combining two high sensitivity phase shift values to determine the diameter.

The device allows the user to employ large measuring volumes (or regions of wave interference), to more easily position the cylinder within the measurement volume. A disadvantage of the large measuring volume is that the effective angular spacing between the detectors increases as the cylinder is moved in the forward direction, i.e. away from the coherent beam source. (Displacement of the cylinder in the reverse direction decreases the effective angular spacing, for detectors located in the forward scattering region). The increase in the angular spacing increases the instrument sensitivity, so that a single calibration constant cannot maintain accuracy. This problem is solved by deliberately decollimating the beams, so that the interfering waves are slightly divergent and the interference fringe spacing increases in the forward direction (rather than being uniform over the entire measuring volume). The increase in fringe spacing reduces sensitivity. Thus, by carefully controlling the fringe flare, the increase in the effective angular spacing of detectors is compensated, to achieve a uniform sensitivity throughout the measuring volume.

If the detectors are located in the backward scattering region, then the error associated with the fiber position is eliminated by using convergent waves in the measuring volume, so that the fringe spacing decreases along the direction of propagation.

The enhanced device also incorporates large-area detectors that help to compensate for the effective fiber tilt on phase measurements.

The present invention is particularly well suited for fiber drawing processes and centrifugal extrusion of fibers. However, it also may be applied to monitor the drawing of wires. Also, while laser beams are the preferred form of coherent energy used to form the measuring volume, two interfering waves of sufficient coherence of other forms of energy, e.g. ultrasonic or acoustic energy, can be caused to interfere and form a measuring volume.

IN THE DRAWINGS

For a further understanding of the above and the other features and advantages, reference is made to the detailed description and to the drawings, in which.

DETAILED DESCRIPTION OF THE PREFERRED EMBODIMENTS

Figure 1:
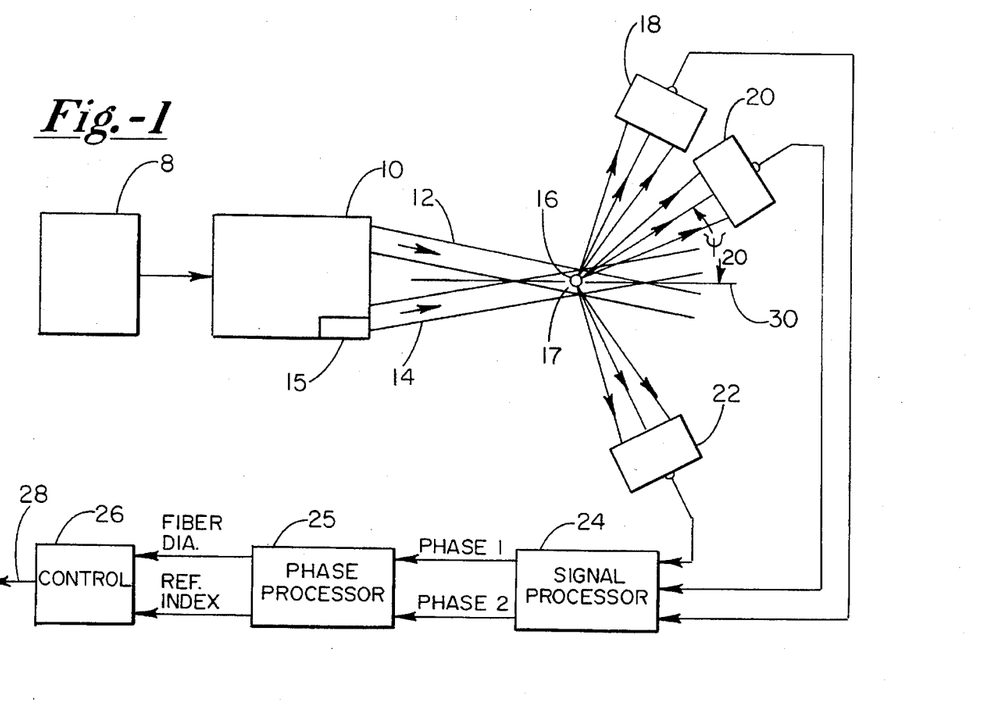
FIG. 1 is a schematic view of a fiber sizing system, employing three scattered light receiving photodetectors.

Turning now to the drawings, there is shown in FIG. 1 an interferometric cylinder sizing system. A laser beam from a laser source 8 is passed through beam conditioning optics 10, where the laser beam is split into two beams 12 and 14. Beam 14 is directed through a Bragg cell 15 to modulate its frequency, so that the beam frequencies are shifted relative to one another. The laser beams 12 and 14 are guided to intersect each other, where they interfere with one another and form a measuring volume 17. A cylindrical object 16 under investigation is located in the interference region of the two laser beams. In this case the cylindrical object is an optical fiber being manufactured by a drawing process. Accordingly, optical fiber 16 is continually present within the measuring volume. In alternative processes employing the same cylinder sizing system, the cylindrical object can be one of numerous centrifugally formed and blown glass fibers. In either event, the light scattered by cylindrical object 16 is collected by the photodetectors 18, 20 and 22, with each photodetector collecting a different portion of the scattered energy. These detectors translate the optical signals into analog electrical signals, which are provided to a signal processor 24. The signal processor selectively combines the periodic signals from the detectors into two pairs of signals, and determines a phase shift or phase difference corresponding to each selected signal/detector pair. The signal processor output, i.e. two phase shift values, is further processed by a phase processor 25. Processor 25, based on the phase shifts, determines fiber diameter and refractive index.

The phase processor provides this information to a process controller 26. Controller 26 governs the manufacturing process and can provide a variety of control signals via a path indicated at 28, e.g. to adjust the speed at which optical fiber 16 is drawn, to provide a warning or alarm, or to shut down the process, all in response to the input from phase processor 25. For further details concerning this type of system, reference is made to the above-mentioned patent application Ser. No. 08/093,812.

Beams 12 and 14 are angularly spaced from one another by an angle $2\alpha$, to define a beam plane which, in FIG. 1, is the plane of the drawing. A beam axis 30, in the beam plane, bisects the beam angle. Accordingly, each of the beams is angularly separated from the beam axis by an angle $\alpha$. Each of photodetectors 18, 20 and 22 intersects the beam plane and is at least approximately centered with respect to the beam plane. Scattered light from fiber 16 travels to each detector at an elevation angle $\psi$, taken with reference to the fiber and with respect to beam axis 30. More particularly, detectors 18, 20 and 22 have elevation angles $\psi_{18}$ of plus 45°, $\psi_{20}$ of plus 25° and $\psi_{22}$ of minus 45°. Each of photodetectors 18, 20 and 22 generates a periodic (more particularly sinusoidal) analog electrical signal in response to received scattered energy.

To conveniently designate directions, the system in FIG. 1 can be considered in terms of an xyz coordinate system in which the x direction is vertical as viewed in the figure, and the y direction is perpendicular to the plane of the figure, and the z direction is horizontal, i.e. the direction of beam axis 30.

The three sinusoidal signals are processed to measure size and refractive index of cylindrical object 16. For this purpose, phase differences $\Phi_1$ and $\Phi_2$ are measured between two pairs of the three signals, e.g. from detectors 18 and 22 and from detectors 20 and 22. Both of these phase difference or phase shift values are proportional to the diameter of cylindrical object 16 denoted by d, according to the equations:

$$\Phi_1 = S_1 d \quad (1)$$

and $$\Phi_2 = S_2 d \quad (2)$$

where sensitivity factors $S_1$ and $S_2$ are given by $$S_1 = \frac{360°}{\lambda} [F_{18} - F_{22}] \quad (3)$$

and $$S_2 = \frac{360°}{\lambda} [F_{20} - F_{22}] \quad (4)$$

Optical parameters in equations (3) and (4) are defined as below:

$$F_{18} = \sqrt{n^2 + 1 - n \sqrt{2(1 - \sin\alpha\sin\psi_{18} + \cos\alpha\cos\psi_{18})}} - \sqrt{n^2 + 1 - n \sqrt{2(1 + \sin\alpha\sin\psi_{18} + \cos\alpha\cos\psi_{18})}} \quad (5)$$

$$F_{20} = \sqrt{n^2 + 1 - n \sqrt{2(1 - \sin\alpha\sin\psi_{20} + \cos\alpha\cos\psi_{20})}} - \quad (6)$$

-continued $$\sqrt{n^2 + 1 - n \sqrt{2(1 + \sin\alpha\sin\psi_{20} + \cos\alpha\cos\psi_{20})}}$$

and $$F_{22} = \sqrt{n_2 + 1 - n \sqrt{2(1 - \sin\alpha\sin\psi_{22} + \cos\alpha\cos\psi_{22})}} - \sqrt{n^2 + 1 - n \sqrt{2(1 + \sin\alpha\sin\psi_{22} + \cos\alpha\cos\psi_{22})}} \quad (7)$$

where $\lambda$ is the wavelength of the laser energy, n is the refractive index of fiber 16, and a is the angle between each laser beam and beam axis 30.

It is clear from equations (1)–(7) that the ratio between and $\Phi_2$ is independent of the cylinder size, and is a function only of the refractive index n of the cylinder, since remain constant. Once the refractive index has been it is used to provide conversion factors for generating cylinder diameter readings based on phase differences.

In certain applications, the refractive index of the cylinder is a function of the cylinder temperature. event, the present system can be used to determine the temperature of optical fiber 16, as well as its Determination of size and temperature (i.e. size and refractive index) is enabled by the three photodetectors, selected in pairs to provide two phase shift values for solving for two variables (d and n) in equations (1) and (2). This avoids a problem inherent in sizing systems that employ two photodetectors generate a single phase shift value. In particular, there is a risk in such systems that a change in the refractive index is misread as a change in fiber diameter, when it occurs due to a change in temperature, material composition or any other factor that influences refractive index rather than diameter.

In other applications, it may be desirable only for the errors caused by refractive index variations. In such cases it is not necessary to consider a ratio of two phase differences. Instead, a linear combination of measured diameters $d_1$ and $d_2$, based on the two phase difference measurements and a nominal refractive index value, are employed to determine fiber diameter.

Considering only the first-order effects, the correct diameter is given as $$d = d_1 + p\Delta d, \quad (8)$$

where $$\Delta d = d_1 - d_2 \quad (9)$$

and parameter p is related to the sensitivity factors as follows:

$$p = \frac{1}{\frac{S_2 \Delta S_1}{S_1 \Delta S_2} - 1}, \quad (10)$$

where $\Delta S_1$ and $\Delta S_2$ represent changes in the corresponding sensitivity factors for a small change in the refractive index. Parameter p can be calculated using equations (3)–(7) or it can be determined experimentally using a first pair of fibers with a certain refractive index n and a second pair with a different refractive index $n+\Delta n$, the two fibers in each pair having known but different diameters.

In a particular realization, involving a laser wavelength $\lambda$ of 0.78 μm and beam angle $2\alpha$ of 4°, the optimal diameter is given by $$d = d_1 + 2.8\Delta d \quad (11)$$

where $d_1$ is the measured diameter based on detectors 18 and 22 at elevation angles of +45° and −45°, respectively, from beam axis 30, and where Δd is the difference between $d_1$ and a second measurement $d_2$ based on detectors 20 and 22 at respective elevation angles of +45° and −25°. The largest error due to linear approximation varies from −0.007 μm to +0.014 μm for a cylinder diameter of 125 μm. This error corresponds to a deviation of −0.00 to +0.023 in the nominal refractive index of 1.4534.

To estimate the uncertainty caused by refractive index correction, equation (11) is written in the following form:

$$d = 3.8d_1 - 2.8d_2. \tag{12}$$

Assuming that random errors ±x can occur in $d_1$ and $d_2$, it is clear from equation (12) that these errors are cumulative if they have opposite signs for $d_1$ and $d_2$ for example, an error of +x in $d_1$ and −x in $d_2$ results in an error of 6.6 x in diameter determination d.

If the measuring system is calibrated with cylinders of known diameter, the mean values of random errors are negligible. It is the variance of the random errors that is significant. The variances (squares of standard deviations) of random errors in the two individual terms on the right-hand side of equation (12) must be added to determine the variance of random error in d. If the standard deviations of errors in $d_1$ and $d_2$ are both given by δ, the variances of the two terms in equation (12) are given by $(3.8\delta)^2$ and $(2.8\delta)^2$. Consequently, the standard deviation of random error in d is given as $$\sqrt{(3.8\delta^2) + (2.8\delta^2)} = 4.72\delta.$$

The increase from δ to 4.72δ reflects the amplification of random errors.

The geometry of the sizing system, in particular the elevation angles of the photodetectors, plays a critical role in the extent to which the standard deviation is increased due to random errors. More particularly, in a system substantially identical to that in FIG. 1, but in which the elevation angles of the photodetectors are +60°, −60° and 15°, the pairs of signals used to generate phase shift values reflect a greater difference in elevation angles, i.e. 45° (120° less 75°) as opposed to 20° (90° less 70°). This difference is reflected in the phase shift values. In the system of FIG. 1, the ratio of $\Phi_1/\Phi_2$ is 0.85. In the alternative geometry, the ratio $\Phi_1/\Phi_2$ is 0.71. The greater difference between phase shift values diminishes random error amplification. More particularly, the alternative detector positioning yields a standard deviation of about 2δ, as compared to 4.72δ of the system in FIG. 1.

Figure 2:
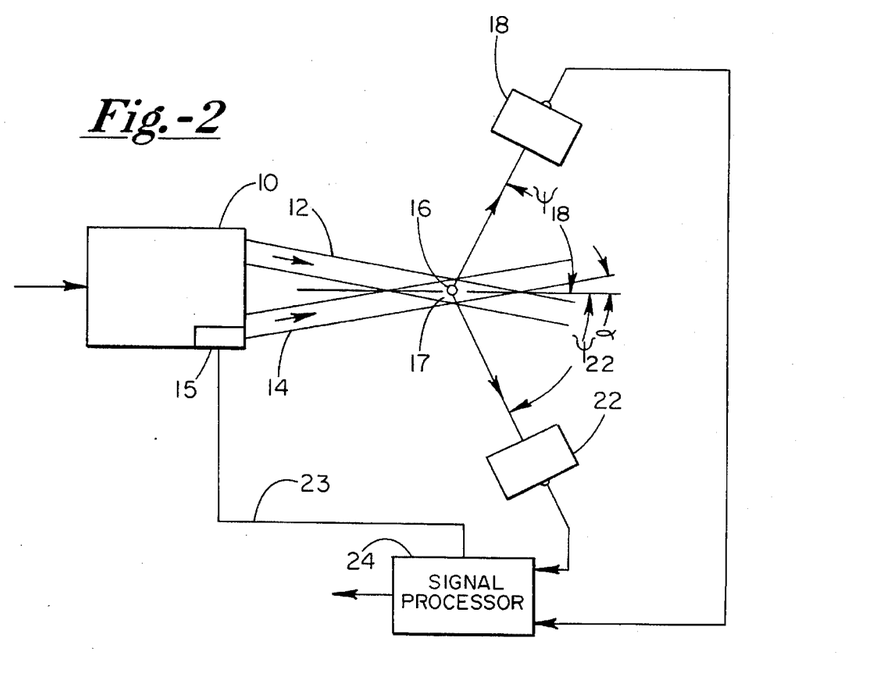
FIGS. 2 and 3 are partial schematic views of alternative systems employing, respectively, a reference signal and a photodetector receiving direct laser energy, in lieu of one of the scattered light receiving photodetectors.

Finally, it is not necessary that all three signals used for size and refractive index measurements originate from the light scattered by the fiber. As seen in FIG. 2, depicting an alternative embodiment of the sizing system, a reference signal can be provided to signal processor 24 in lieu of the output of one of detectors 18, 20 and 22. As shown, the reference signal can be derived from the electrical signal that drives Bragg cell 15. The signal path from the Bragg cell to the signal processor is indicated at 23.

Figure 3:
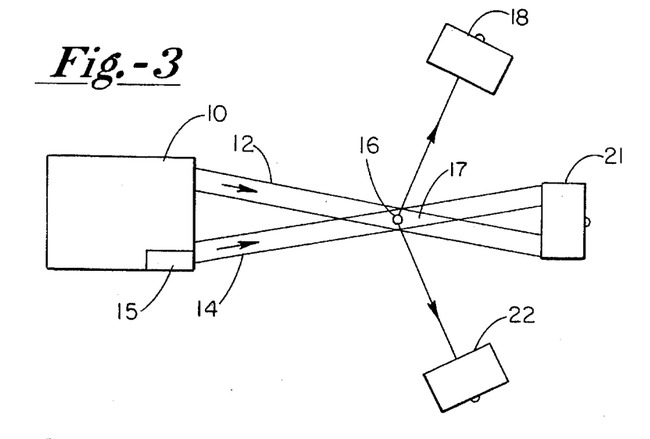

Alternatively, a reference signal can be based on the unscattered direct light of beams 12 and 14. FIG. 3 shows a detector 21 positioned to receive unscattered light travelling in the z direction, beyond measuring volume 17.

Figure 4A:
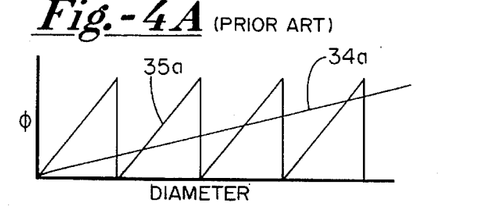
FIGS. 4a and 4b are charts illustrating a contrast between two approaches to measuring phase shifts that exceed 360°.

The three-detector arrangement of FIG. 1 may also be used to extend the measurable size range of cylindrical objects. In a two-detector system, a single phase-shift signal is acquired, so that a phase shift range of 360° or 2π radians is available for measurement. If the system is designed to obtain a high sensitivity S (degrees per micron), the measurable size range (microns) is restricted to 2π/S. A previously known approach to overcome this limitation involves using three photodetectors to obtain two phase shift values or sets of phase shift values: one based on high sensitivity, and the other based on a wide range of possible cylinder or particle diameters. This approach is illustrated in FIG. 4a, where a line 34a plots phase shift values $\Phi_1$ based on a low sensitivity arrangement, and a sawtooth curve 35a plots much more sensitive phase shift values $\Phi_2$. None of the phase shift values on curve 34a exceeds 360°, with curve 35a repeating several times as it intersects curve 34a. Thus, the higher sensitivity of phase readings $\Phi_2$ are combined with the broader range encompassed by phase value readings $\Phi_1$. The system range is limited by the exclusion of any values of the $\Phi_1$ that exceed 360°.

Figure 4B:
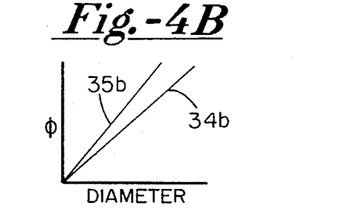

By contrast, the system in FIG. 1 permits covering a broad range, while maintaining a high sensitivity with respect to both sets of phase difference values. This arrangement may be understood by considering two phase shift signals, $\Phi_1$ and $\Phi_2$, in connection with FIGS. 4b, 5 and 6. As in the conventional case (FIG. 4a) $\Phi_1$ reflects the relatively less sensitive photodetector arrangement. However, in the present arrangement (FIG. 4b) the respective sets of phase shift values $\Phi_1$ and $\Phi_2$ (34b and 35b) are substantially similar as to sensitivity. In fact, it is preferred that phase shift values $\Phi_1$ and $\Phi_2$ both reflect highly sensitive arrangements, with a ratio ρ (i.e. $\Phi_1/\Phi_2$) being at least 0.7, and more preferably closer to 1, although not equal to 1.

Figure 5:
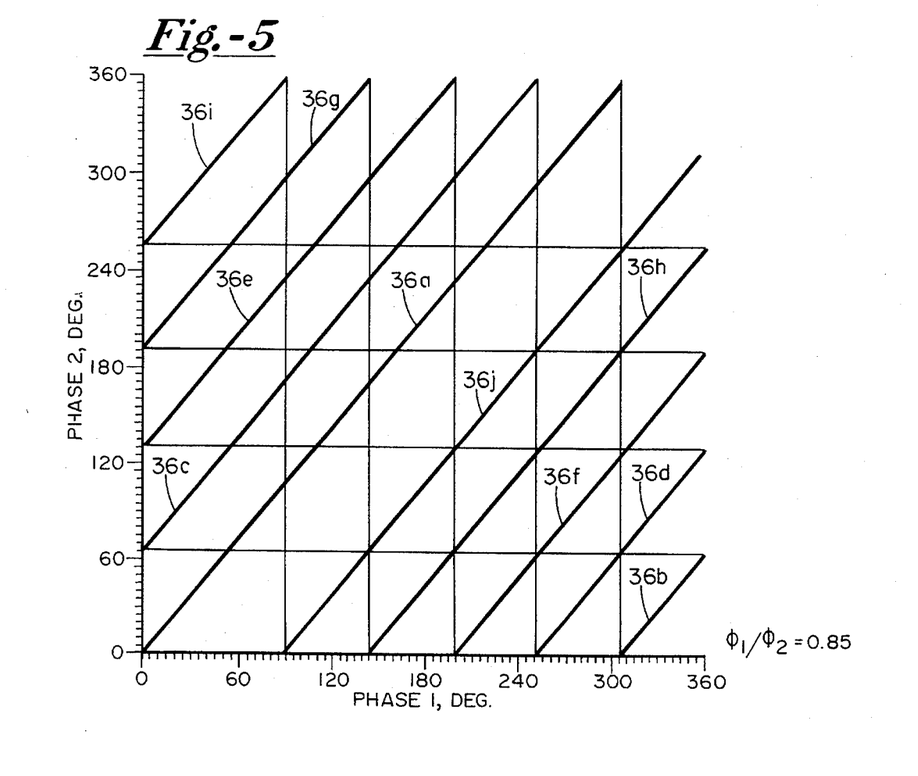
FIG. 5 is a graph of two series of phase shift measurements using the system of FIG. 1, illustrating the use of phase shift measurements to determine actual phase shifts exceeding 360°.

The measuring system of FIG. 1 can be employed to achieve the desired result. Given the detector elevation angles of +45° (detector 18), +25° (20) and −45° (22), and the above-discussed selection of photodetector and signal pairs, the value of ρ is 0.85. This case is shown in FIG. 5, where $\Phi_2$ is plotted against $\Phi_1$. The curve is bound between zero and 360°. $\Phi_1$ and $\Phi_2$ are close to zero for very small fiber diameters, but increase in proportion to one another along a curve segment 36a until the value of $\Phi_2$ reaches 360°. Valid combinations of $\Phi_1$ and $\Phi_2$ continue along a curve segment 36b with increasing fiber diameters. For diameters occurring on curve 36b, the measured value $\phi_2$ must be increased by 360° to determine actual phase shift $\Phi_2$. With a further increase in fiber diameter, $\Phi_1$ also reaches 360°. Valid combinations of phase shifts continue along a curve segment 36c, where in each case the actual phase shift is obtained by adding 360° to the corresponding measured phase shift. Further curve segments 36d–36j reflect further increases in diameter, with all of the oblique line segments representing the response curve.

For determining the cylinder diameter, the total phase shifts $\Phi_1$ and $\Phi_2$ must be calculated from the measured phase shift values $\phi_1$ and $\phi_2$. The following procedure may be used:

1. Calculate N using $$N' = \frac{\rho \phi_2 - \phi_1}{360(1-\rho)} \tag{13}$$

2a. If N' is greater than or equal to −0.5, then:

$$N = trunc\ (N'+0.5), \tag{14}$$

where the function "trunc" yields the integer nearest to but smaller than the quantity (N'+0.5). N represents the number of cycles, i.e. 360° increments that must be added to measured values $\phi_1$ and $\phi_2$, to obtain the actual phase shift values $\Phi_{1t}$ and $\Phi_{2t}$. In other words:

$$\Phi_{1t} = \phi_1 = 360(N) \tag{15}$$

$$\Phi_{2t}=\phi_2+360(N) \quad (16)$$

2b. However, if N' is less than −0.5, then:

$$N=trunc\ (N'+\rho/(1-\rho)+0.5),\ \text{and} \quad (17)$$

N is used to obtain $\Phi_{1t}$ and $\Phi_{2t}$ as follows:

$$\Phi_{1t}=\phi_1+360\ (N) \quad (18)$$

$$\Phi_{2t}=\phi_2+360(N+1) \quad (19)$$

The total phase shift values $\Phi_{1t}$ and $\Phi_{2t}$ may be combined linearly to obtain an accurate estimate of cylinder diameter, using the following equation:

$$d=c_1\frac{\Phi_{1t}}{S_1}+c_2\frac{\Phi_{2t}}{S_2} \quad (20)$$

where $S_1$ and $S_2$ are the sensitivities (degrees/micron) for the two phase-shift measurements. The constants $c_1$ and $c_2$ are given by:

$$c_1=\frac{\rho^2}{1+\rho^2}, \quad (21)$$

$$c_2=\frac{1}{1+\rho^2}. \quad (22)$$

The above correlations are based on the assumption that the measuring uncertainty is approximately the same for $\Phi_1$ and $\Phi_2$. In a broader sense, constants $C_1$ and $C_2$ are optimized within the following framework: (i) $C_1+C_2=1$; and (ii) both $C_1$ and $C_2$ are greater than 0.2, and more preferably exceed 0.3 when $\rho$ is in the range of 0.5–1. If $\rho$ is at least 0.7, each constant C should be at least 0.3. Within this framework, the values for $C_1$ and $C_2$ can be selected to maximize accuracy. This procedure extends the range of measurable diameters by a factor of k over the available range using a single phase difference $\Phi_2$ alone, where $$k=trunc[1/(1-\rho)] \quad (23)$$

Thus, values of $\rho$ that more clearly approach 1 involve further extensions of the measurable range.

Further in view of equation 20, measurement uncertainty can be reduced by a factor of $1/\sqrt{+e}$,rad $1+\rho^{2\ +ee}$, as compared to the uncertainty encountered if $\Phi_2$ is the only value used for measurement.

Figure 6:
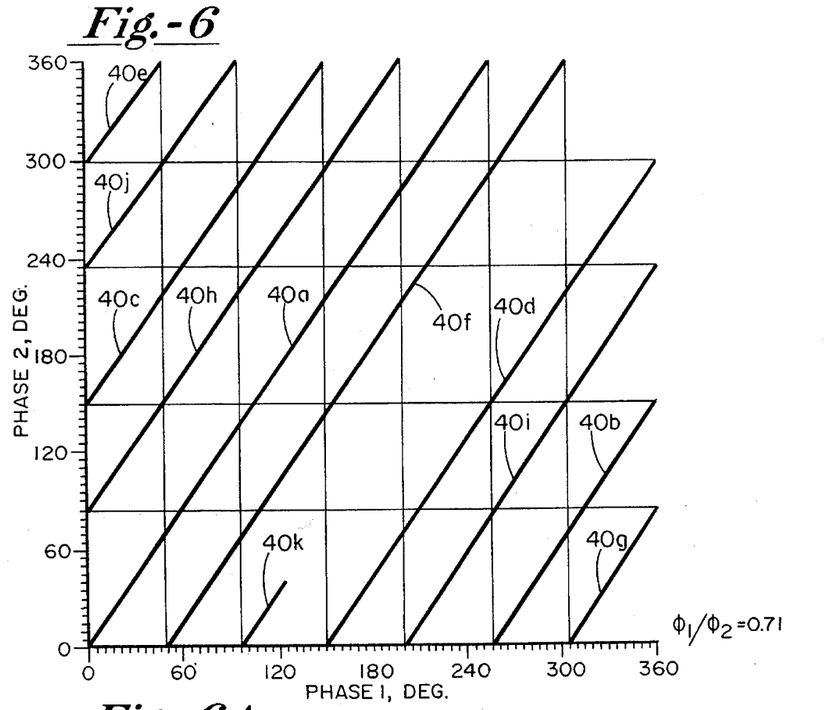
FIGS. 6 and 6a are graphs similar to that in FIG. 5, plotting two phase shift measurements using alternative three-detector systems.

An alternative plot of phase shift values $\Phi_1$ and $\Phi_2$ is shown in FIG. 6. This plot is similar to that in FIG. 5, but is based on detector elevation angles of +60° (detector 18), +15° (20) and −60° (22). In this case, the ratio $\rho$ is 0.71. A curve 40 includes portions 40a–40k. Consecutive curve segments are spaced farther apart, but the segments as a whole overlap to yield a distance between adjacent segments comparable to that in FIG. 5. This arrangement does not afford quite the accuracy of the arrangement in FIG. 5. However, it is particularly well suited when the same system is employed for refractive index measurement, which favors a lower ratio $\rho$.

Figure 6A:
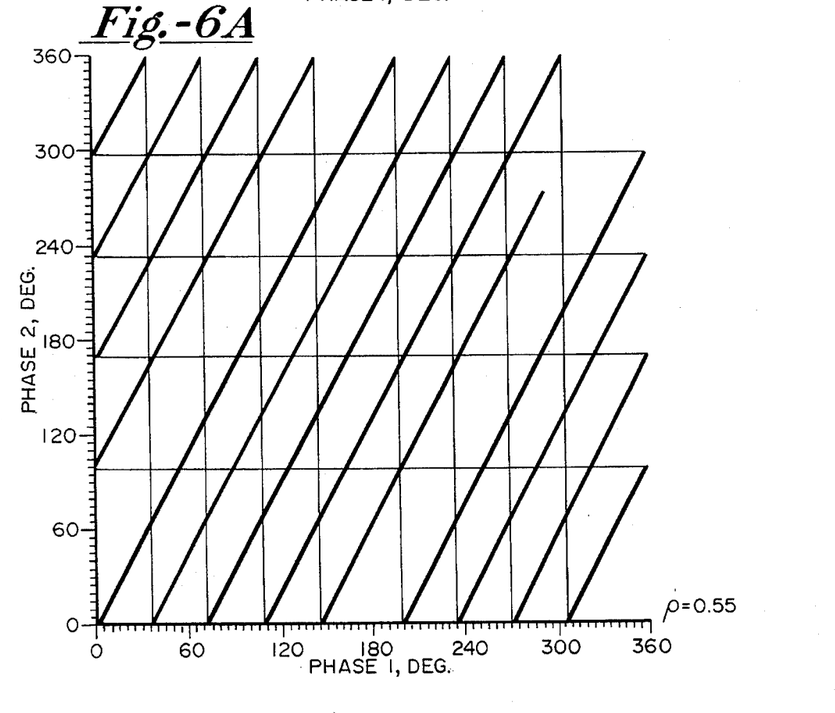

In a less preferred arrangement, that nonetheless illustrates the principle of the invention, the ratio $\rho$ exceeds, but is approximately equal to, 0.5, e.g. 0.55. A plot based on this ratio FIG. 6a is similar to the plots in FIGS. 5 and 6, i.e. featuring a curve made up of oblique, parallel and spaced apart curve segments. The initial segment features equal measured and actual phase shift values. Along the second segment, a 360° increment is added only to the more sensitive phase difference. Along a third curve segment, a 360° increment is added to both measured phase shift values to compute the actual phase shift values. In all cases, sufficient separation between adjacent curve segments provides an unambiguous determination of the appropriate curve segment for a given pair of measured phase shift values, to extend the useful range of each set of actual phase shift values well beyond the 360° limit for measured values.

A salient feature of this approach, as compared to the conventional approach depicted in FIG. 4a, is the availability of two highly sensitive values for determining diameters of fibers, particles and other objects. While neither measured phase shift value $\phi$ can exceed 360°, the combination of two measured values $\phi_1$ and $\phi_2$ determines their location on a plot such as that of either FIG. 5 or FIG. 6. The pairs of values have sufficient accuracy, in view of the spacing between oblique curve segments, to unambiguously locate the measured value on the appropriate curve segment. Thus, each pair of measured values $\phi_1$ and $\phi_2$ is used to determine its corresponding pair of actual phase shift values $\Phi_{1t}$, $\Phi_{2t}$.

It can be appreciated that while this approach has been disclosed in connection with a fiber diameter measuring system, it is applicable, as well, to laser Doppler velocimetry systems measuring spherical particle diameters.

Figure 7:
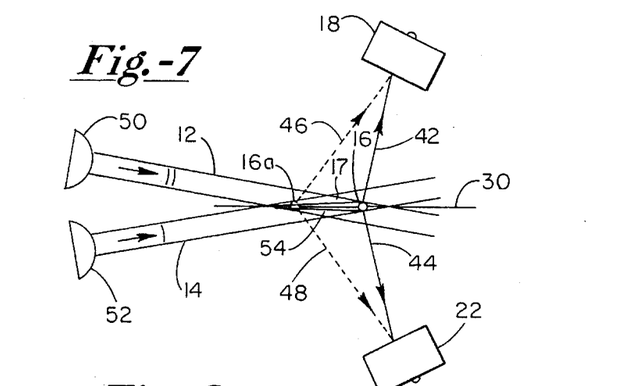
FIG. 7 is a schematic view of an alternative embodiment of fiber sizing system featuring an enlarged viewing volume and compensation for fiber displacement across the viewing volume.

Yet another feature of the system is illustrated in FIG. 7, featuring a system similar to that in FIG. 1 except that measuring volume 17 is enlarged. A larger measuring volume is advantageous, in that less skill is required to properly align the measuring volume with respect to fibers or other objects being measured. However, the enlarged measuring volume can lead to measurements that are undesirably sensitive to displacement of the fiber, in the z direction, within the measurement volume. At the cylinder location 16, the light rays 42 and 44 represent scattering to detectors 18 and 22, respectively. In other words, these rays determine an elevation angle for each of detectors 18 and 22. The measurement sensitivity directly depends upon the elevation angles, which together comprise the angle between these two rays. As cylindrical object 16 is moved in the z direction to a location 16a, both elevation angles are reduced, as seen in connection with scattered rays 46 and 48. If the system has been calibrated based on location 16, and if beams 12 and 14 are collimated to yield the usual uniform fringe spacing, then fiber diameter measurements taken with the fiber at location 16a will be erroneous, i.e. smaller than the actual diameters.

As seen in FIG. 7 with reference to FIG. 1, however, cylindrical lenses 50 and 52 are positioned between the conditioning optics and measuring volume 17. Each cylindrical lens decollimates its associated beam, causing the beam to diverge slightly as it approaches the measuring volume. As a result, interference fringes 54 diverge in the z direction away from the laser source, i.e. from left to right as viewed in FIG. 7.

Figure 8:
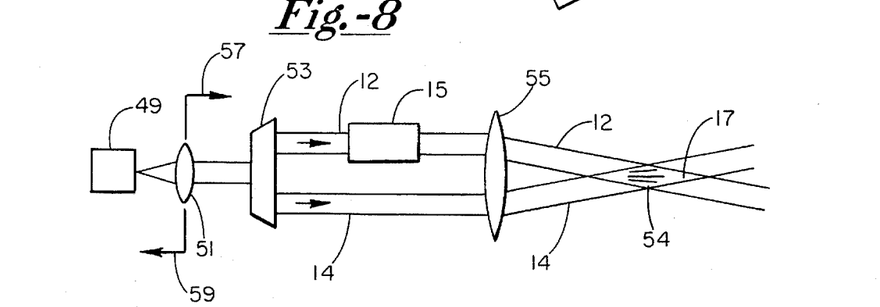
FIG. 8 shows the use of a laser diode collimator for introducing fringe flare.

If a diode laser is used as a light source, fringe divergence can be obtained without the cylindrical lenses, simply by displacing the collimating lenses in front of the diode, as illustrated in FIG. 8. More particularly, a diode laser 49 provides laser energy which is collimated by a collimating lens 51, then provided to a beam splitter 53. One of the resulting beams 12 and 14 is shifted by a Bragg cell 15, and a focusing lens 55 causes the beams to intersect at measuring volume 17. The position of collimating lens 51 relative to diode laser 49, in the Z direction, controls the flaring, if any, in interference fringes 54. Lens movement toward from the diode laser (arrow 59) increases the degree of interference fringe divergence. Conversely, lens movement in the direction indicated by arrow 57 decreases the degree of divergence with sufficient movement causing the fringes to become convergent.

The flared or divergent interference fringes compensate for the change in elevation angles, thus to provide uniform sensitivity throughout enlarged measuring volume 17.

Divergent fringes are produced by interfering the two laser beams at a location where the wavefronts are convex. The relationship between the fringe spacing $d_f$ and the radius of curvature R may be expressed as follows:

$$d_f = d_{f0}\left(1 + \frac{z}{R}\right) \quad (24)$$

where z is the distance from the center of the crossing region of the two laser beams and $d_{f0}$ is the fringe spacing, provided that the interfering beams have plane wavefronts. The latter is given as $$d_{f0} = \frac{\lambda}{1 \sin\alpha} \quad (25)$$

In the case of divergent fringes, an effective beam half-angle $\alpha_{eff}$ may be obtained by comparing equation (24) with (25):

$$\sin\alpha_{eff} = \frac{\sin\alpha}{\left[1 + \frac{z}{R}\right]} \quad (26)$$

A Gaussian laser beam has plane wavefronts at the smallest cross-section, known as the waist, and exhibits concave and convex wavefronts before and after the waist respectively. The radius of curvature at a given distance 1 from the waist is a function of the waist radius w and the laser wavelength, i.e.

$$R = l\left[1 + \left(\frac{\pi w^2}{\lambda l}\right)^2\right] \quad (27)$$

According to equation (27), the smallest achievable radius of curvature is given by $$R_{min} = \frac{2\pi w^2}{\lambda} \quad (28)$$

Hence, if a radius of curvature of 1 meter is desirable for a wavelength of 0.78 μm, then the waist radius should be 0.35 mm or smaller.

Also, an effective elevation angle is obtained as below:

$$\tan\psi_{eff} = \frac{r_d \sin\psi}{r_d \cos\psi - z} \quad (29)$$

where $r_d$ and $\psi$ are the distance of the detector and elevation angle of the detector respectively, provided that the fiber is located at the center of the measuring volume.

Figure 9:
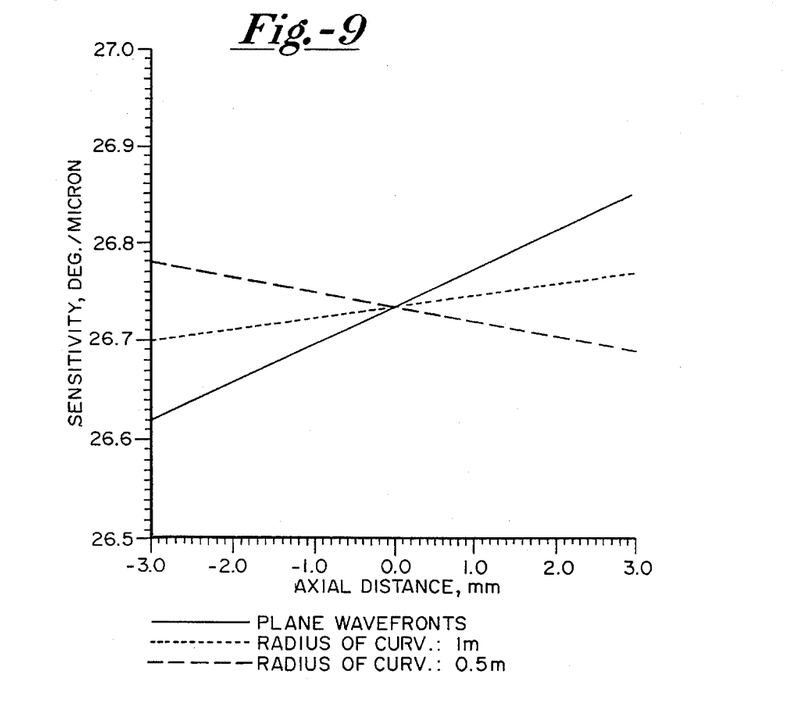
FIG. 9 is a graph showing calculated variations in the measuring sensitivity for different values of wavefront curvature in the measuring volume.

Using the above effective angles in equations (3)–(7), the sensitivity of an optical arrangement is shown in FIG. 9 as a function of fiber location. In the case of plane wavefronts, a consistent increase in sensitivity is encountered as the fiber is moved forward along the bisector of the beams. This effect is partially compensated when wavefronts with radii of curvature of 1 meter are used and over-compensated when the radii of curvature are 0.5 meters. Hence, the optimal value of radius of curvature lies between 0.5 and 1 meter and may be computed iteratively.

According to equations (27) and (28), the above value of radius of curvature may be obtained by focusing the laser beams to a submillimeter waist size and locating the waist within 1 meter of the measuring volume.

Usually, one would use simulations, as considered above, in order to determine a range in which the optimal radius of curvature lies. Subsequently, the optimal setting would be obtained experimentally by varying the radius of curvature while scanning the fringes with a fiber.

Figure 10:
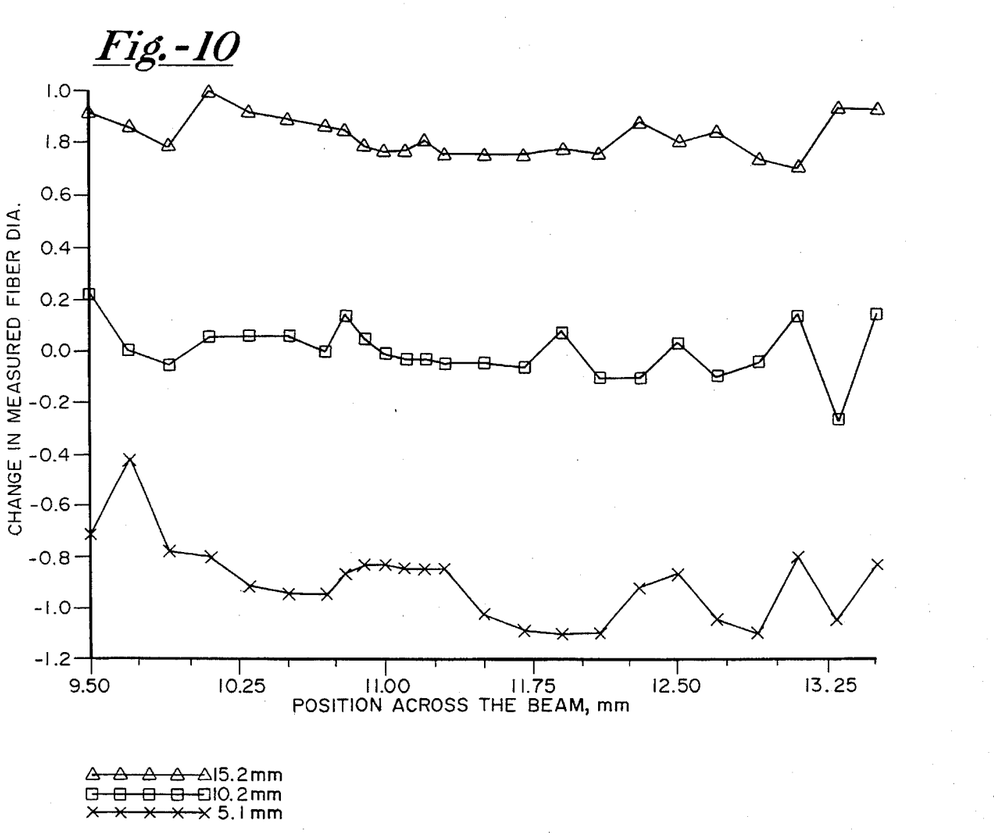
FIG. 10 is a graph showing fiber size measurements obtained using a measuring volume with uniform fringe spacing.
Figure 11:
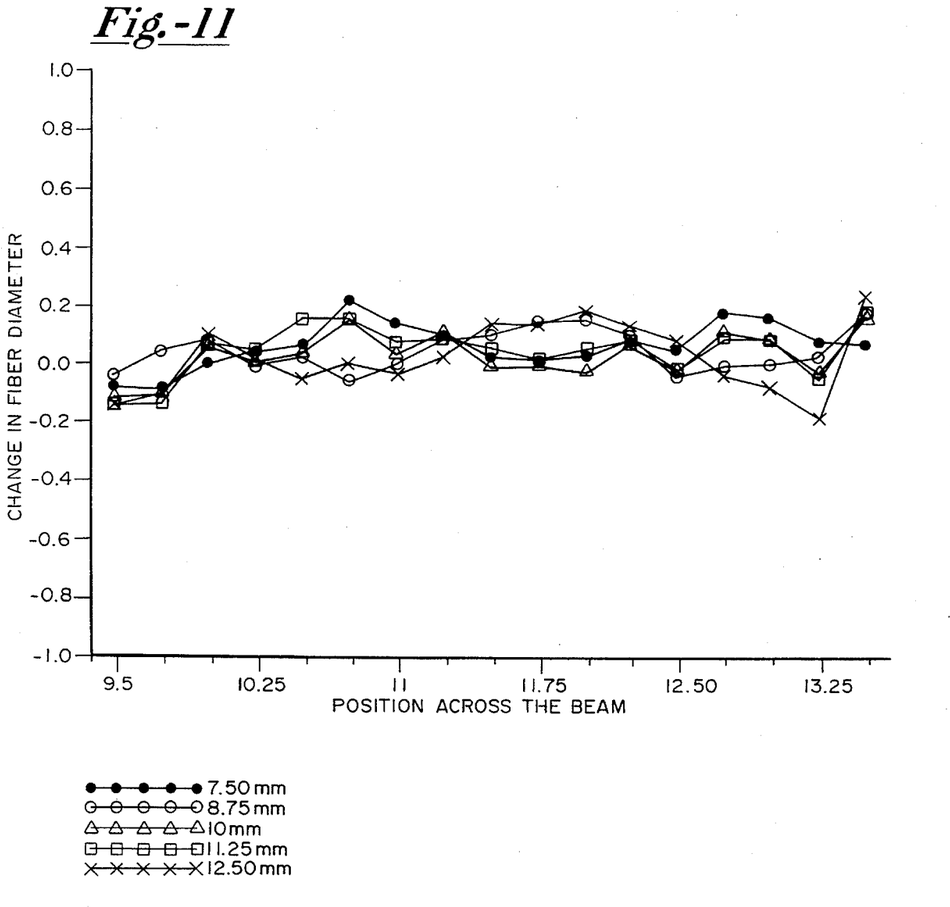
FIG. 11 is a graph showing fiber size measurements obtained using a measuring volume in which diverging fringes compensate for fiber displacement within the measuring volume.

The effectiveness of this solution may be appreciated from FIGS. 10 and 11. The curves in these figures correspond to different fixed values of the z coordinate describing fiber position. The x axes represent x coordinates describing the fiber locations. The y axes show deviation of the measured fiber diameter from the nominal diameter value. FIG. 10 corresponds to a system in which the beams have been collimated to form uniform interference fringes, and shows a systematic deviation of the measured diameter value with changing fiber locations in the z direction. On the other hand, the sensitivity to changes in z location is virtually eliminated in FIG. 11, corresponding to divergent fringes. The flare or degree of divergence can be adjusted with reference to the specific placement of the detectors and optical components. Preferably, detectors 18 and 22 are the same distance from fiber 16, and have equal and opposite elevation angles.

Further, as seen from both FIGS. 10 and 11, fiber excursions in the x direction do not produce significant measurement errors, as a change to the elevation angle of detector 18 is compensated by an opposite change in the elevation angle of detector 22.

Figure 12:
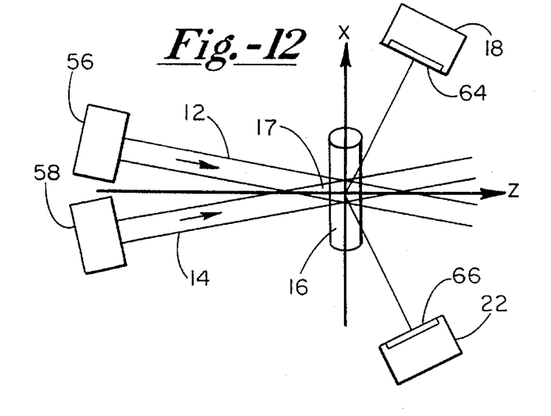
FIG. 12 is a diagrammatic view of a fiber sizing system employing photodetectors effectively enlarged in the direction perpendicular to the beam plane by converging optics.
Figure 13:
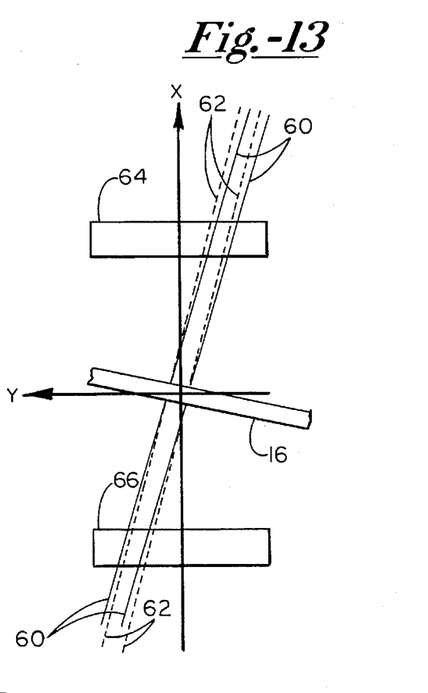
FIG. 13 is a diagrammatic view of the system like that in FIG. 12, taken from a viewpoint that emphasizes fiber tilt or skew and the resultant path of light scattered by the fiber.

The measured value of the cylinder diameter is generally influenced by its orientation relative to the plane of the laser beams. For correct measurement of a right-circular cylinder, the cylinder should be oriented normal to the beam plane, i.e. extended in the y direction. In practice, however, the cylindrical object may be tilted or skewed relative to the y axis. This is shown in FIG. 12, where the image of fiber 16 should appear as a circle, but instead appears as a shortened cylinder. Systems in which separate fibers are centrifugally generated and carried in a fluid are particularly susceptible to this skew. Simulations and experiments have shown that more errors are introduced by the cross-beam tilt than forward tilt. Cross-beam tilt is illustrated in FIG. 13. It takes place in xy plane, the plane perpendicular to the beam axis. By contrast, forward tilt occurs in the yz plane.

Figure 14:
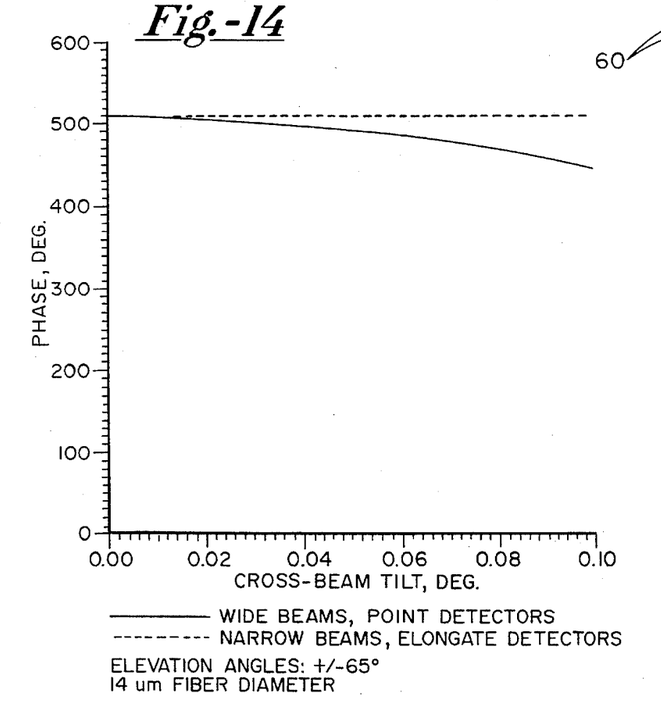
FIG. 14 is a chart illustrating measured fiber diameter as a function of fiber tilt or skew for the system in FIG. 13, and for a conventional system.

As shown in FIG. 14, cross-beam tilt can have a significant adverse effect on measured values of phase, particularly if beams 12 and 14 are expanded and the detection area is relatively small. A response to tilt in such a system, represented by the solid line in FIG. 14, shows about a 10% deviation in measured phase for a tilt of only about 0.1 degree.

Conventional systems have involved relatively wide beams and narrow detectors. Narrow detectors have been favored on the theory that light scattered by a skewed or tilted fiber would not reach the detectors, thus to avoid erroneous measurements. For example, Mignon et al (1994) have restricted the receiving apertures to ±0.1 openings in the direction perpendicular to the beam plane.

However, the above approach has proved ineffective, because narrow apertures do not fully block the scattered radiation. For certain degrees of fiber tilt, the scattered energy is blocked only partially, resulting in large phase errors.

The solutions to this problem are shown in FIGS. 10 and 11. First, cylindrical lenses 56 and 58, positioned between the beam collimating optics and the measuring volume, narrow the beam in the direction perpendicular to the beam plane, i.e. the xz plane. The beams, however, are maintained with sufficient width to permit placement of detectors 18 and 22 in the near field. Also, the beams are maintained with sufficient width so that scattered radiation resulting from the two beams, indicated respectively at 60 and 62, interfere at the detectors.

Further, the receiving apertures are enlarged in the y direction, to cover all fiber tilt angles (not exceeding a certain practical limit, e.g. ±10°). An increase in the aperture width is depicted in FIG. 13, where detectors apertures 64 and 66 of detectors 18 and 22 respectively, are elongate in the y direction. The scattered light is collected by different portions of these apertures for different fiber tilts and needs to be focused on the sensitive part of the respective detectors. For correct measurement of fiber diameter, the light from one portion should not be favored over another part. The objective is achieved easily by employing detectors with large sensitive areas. In the related field of laser Doppler velocimetry, it is a common practice to employ an exposed detector area that does not exceed twice the size of the measuring volume image, considered to encompass the region in which intensity of the laser energy is at least equal to about 13.5% (i.e. $1/e^2$, e being the number whose natural log is 1) of the maximum intensity at the measuring volume center. This formula does not give satisfactory results in the case of fibers with varying tilts. For sizing fibers, the light sensitive area should be at least four times the area of the measuring volume image.

Thus, the larger area detectors (or larger effective area detectors) capture the scattered light displaced by a tilted or skewed fiber. The response of this arrangement is indicated by the dotted line in FIG. 14. Sensitivity of the measuring device to fiber tilt is thus reduced significantly by increasing the effective detector size perpendicular to the beam plane. While in principle it is possible to collect light uniformly over a large aperture and focus collected light onto small area detectors, optical design is simplified by using a detector with a large sensitive area. A PIN diode is an appropriate choice.

Thus, in accordance with the present invention, substantially more accurate diameter readings are obtained, with compensation for changes in refractive index due to temperature changes and other factors. Accurate measurements are obtained employing highly sensitive phase shift readings, yet with coverage of a broad range of fiber diameters. The system can employ a substantially enlarged measuring volume, with interference fringes selectively flared to compensate for fiber displacements within the measuring volume. Finally, the system is less sensitive to skew or tilt of the fiber being measured.

What is claimed is:

1. An apparatus for non-contact measurement of objects, including:
   a source of coherent energy and a beam-forming means for generating two linearly propagating beams of the coherent energy;
   a beam guide means for orienting the beams at a predetermined beam angle relative to one another to define a beam plane, said beams interfering with one another over a measuring region at their intersection;
   a support means for positioning the beam plane with respect to an object to cause the object and the measuring region to intersect one another, whereby the object scatters the coherent energy;
   a detection means for providing first and second different phase values based on detecting the scattered coherent energy at respective and different first and second locations spaced apart from the measuring region;
   a means for providing a third phase value; and
   a processing means for combining each of the first and second different phase values with the third phase value to generate respective first and second phase shift values, and for determining a dimension of the object based on the first and second phase shift values;
   wherein the first and second locations are selected for angular positioning relative to one another and wherein the third phase value is selected with reference to the first and second phase values, such that the ratio ρ of the first phase shift value to the second phase shift value is greater than 0.5 and less than 1.

2. The apparatus of claim 1 wherein:
   the object is a cylinder and the dimension is the cylinder diameter, and wherein the diameter is determined according to the formula:

$$d = c_1 \frac{\Phi_{1t}}{S_1} + c_2 \frac{\Phi_{2t}}{S_2}$$

where $S_1$ and $S_2$ are sensitivities (degrees/micron) associated with the first and second phase shift values, $\Phi_{1t}$ and $\Phi_{2t}$, respectively, and $C_1$ and $C_2$ are constants, each greater than 0.2, whose sum is equal to 1.

3. The apparatus of claim 1 wherein:
   the object is a circular cylinder oriented with a longitudinal axis thereof substantially perpendicular to the beam plane, and wherein said detection means includes first and second energy detectors positioned to intersect the beam plane at the first and second locations, respectively.

4. The apparatus of claim 1 wherein:
   the object is a spherical particle.

5. An apparatus for non-contact measurement of objects, including:
   a source of coherent energy and a beam forming means for generating two linearly propagating collimated beams of the coherent energy;
   a beam shaping means for selectively decollimating the beams;
   a beam guide means for receiving the decollimated beams and for orienting the decollimated beams at a predetermined beam angle relative to one another to define a beam plane, said beams interfering with one another over a measuring region at their intersection to form interference fringes that are flared to provide a gradient in a fringe spacing of said fringes throughout the measuring region;
   a support means for positioning the beam plane with respect to an object to cause the object and the measuring region to intersect one another so that the object scatters the coherent energy;
   a coherent energy detector for providing a first phase value based on detecting the scattered coherent energy at a first location spaced apart from the measuring region;
   a means for providing a second phase value; and
   a processing means for combining the first and second phase values to generate a phase shift value indicating a transverse dimension of the object;
   wherein the first coherent energy detector intersects the beam plane and is positioned at a predetermined elevation angle relative to a beam axis that bisects the beam angle, and wherein the interference fringes are selectively flared to compensate for changes in the elevation angle due to displacements of the object within the measuring volume.

6. The apparatus of claim 5 wherein:
   the first coherent energy detector is positioned to receive scattered coherent energy in the forward half-plane, and the beam shaping means causes the beams to diverge in the direction toward the measuring region whereby the fringe spacing increases along the direction of beam propagation.

7. The apparatus of claim 6 wherein:
said beam shaping means includes a concave cylindrical lens.

8. The apparatus of claim 7 wherein:
the beam shaping means is adjustable to controllably vary the degree of beam divergence.

9. The apparatus of claim 5 wherein:
the means for providing the second phase value includes a second coherent energy detector for detecting the scattered coherent energy at a second location different than the first location and spaced apart from the measuring region.

10. The apparatus of claim 9 wherein:
the first and second detectors are substantially the same distance from the measuring region, and symmetrically angularly spaced apart from the beam axis.

11. The apparatus of claim 5 further including:
a modulation means for shifting the frequency of one of the beams by a predetermined amount.

12. An apparatus for non-contact measurement of cylindrical objects, including:
a source of coherent energy and a beam forming means for generating two linearly propagating beams of the coherent energy;
a beam guide means for orienting the beams at a predetermined beam angle relative to one another to define a beam plane, said beams interfering with one another over a measuring region at their intersection;
a support means for positioning the beam plane with respect to a cylindrical object to cause the cylindrical object and the measuring region to intersect one another with a longitudinal axis of the cylindrical object substantially perpendicular to the beam plane, so that the object scatters the coherent energy;
a signal generating means including first and second energy detecting means for generating respective first and second periodic signals based on respective portions of the scattered coherent energy received by the first and second detecting means;
a phase shift generating means, operatively associated with the signal generating means, for combining the first and second periodic signals to generate a phase shift value indicating a transverse dimension of the cylindrical object;
wherein each of the first and second energy detecting means has an aperture that intersects the beam plane, is elongate in the direction perpendicular to the beam plane, and extends away from each side of the beam plane by an angle greater than 0.1°; wherein each of the energy detecting means has an energy sensitive region greater than twice the image of a width of the measuring volume, where the measuring volume width is defined as the region in which coherent energy intensity is at least 0.135 times a maximum intensity at the center of the measuring volume.

13. The apparatus of claim 12 further including:
a first beam shaping means for collimating the energy beams so that the beams are collimated when received by the beam guide means, and a second beam shaping means, between the beam guide means and the measuring region, for narrowing a beam width of each of the beams in the direction perpendicular to the beam plane.

14. The apparatus of claim 13 wherein:
the first and second energy detecting means are located in a near field of the beams, and the coherent energy scattered due to each of the beams interferes with the coherent energy scattered due to the other beam at each of the detecting means.

15. A process for measuring objects, including the steps of:
generating two linearly propagating beams of coherent energy, angularly separated from one another at a predetermined beam angle, and causing the beams to intersect one another to define a beam plane and to provide a measuring region at the intersection of the beams;
positioning the beam plane and measuring region with respect to an object to cause the object and the measuring region to intersect one another, so that the object scatters the coherent energy;
detecting first and second distinct portions of the scattered coherent energy at respective and different first and second locations spaced apart from the measuring region;
providing first and second phase values based on detecting the scattered coherent energy at said respective and different first and second locations, and further providing a third phase value;
combining the first and second phase values with the third phase value to generate respective first and second measured phase shift values, wherein each of the first and second measured phase shift values is at most 360 degrees;
based on the first and second measured phase shift values, determining a number N of 360 degree increments, where N is a positive integer; and
adding N 360 degree increments to the second measured phase shift value and further adding either N or (N−1) 360 degree increments to the first measured phase shift value, as predetermined by the measured phase shift values, to calculate first and second actual phase shift values.

16. The process of claim 15 including the further step of:
selecting the first and second locations with respect to one another and with reference to the third phase value, such that a ratio ρ of the first actual phase shift value to the second actual phase shift value is greater than 0.5 and less than 1.0.

17. The process of claim 16 wherein:
said ratio ρ is between 0.7 and 1.0.

18. The process of claim 17 including the further step of:
determining a dimension of the object based on a linear combination of the first and second actual phase values, according to the equation:

$$d = c_1 \frac{\Phi_{1t}}{S_1} + c_2 \frac{\Phi_{2t}}{S_2}$$

where d is the diameter, $\Phi_{1t}$ and $\Phi_{2t}$ are the actual phase shift values, $S_1$ and $S_2$ are sensitivities respectively associated with the first and second phase shift measurements, and $c_1$ and $c_2$ are constants, each greater than 0.2, whose sum is equal to 1.

* * * * *

UNITED STATES PATENT AND TRADEMARK OFFICE
CERTIFICATE OF CORRECTION

PATENT NO. : 5,513,004
DATED : April 30, 1996
INVENTOR(S) : Amir A. Naqwi, et al It is certified that error appears in the above-indentified patent and that said Letters Patent is hereby corrected as shown below:

Claim 5, column 14, line 45 before "coherent" insert the word -- first --.

Signed and Sealed this

Third Day of September, 1996

Attest:

BRUCE LEHMAN

*Attesting Officer*      *Commissioner of Patents and Trademarks*